No. 813,789. PATENTED FEB. 27, 1906.
A. FOX.
JAR HOLDER.
APPLICATION FILED FEB. 16, 1905.
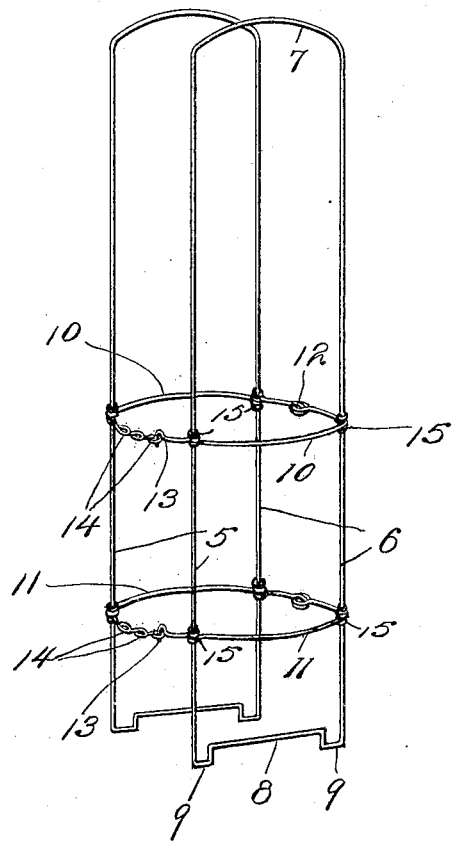
Witnesses
Inventor
Annie Fox
Attorneys

UNITED STATES PATENT OFFICE.

ANNIE FOX, OF MARLETTE, MICHIGAN.

JAR-HOLDER.

No. 813,789.　　　Specification of Letters Patent.　　　Patented Feb. 27, 1906.

Application filed February 16, 1905. Serial No. 245,969.

*To all whom it may concern:*

Be it known that I, ANNIE FOX, a citizen of the United States, residing at Marlette, in the county of Sanilac, State of Michigan, have invented certain new and useful Improvements in Jar-Holders; and I do hereby declare the following to be a full, clear, and exact description of the invention, such as will enable others skilled in the art to which it appertains to make and use the same.

This invention relates to jar-holders; and it has for its object to provide an article of manufacture which may be made at a minimum cost and entirely of wire.

A further object of the invention is to provide a construction which will prevent contact of one jar with another and will support the jar above the bottom of a receptacle in which it may be placed, it being understood that in the filling of the jars with preserves they are placed in a vessel or utensil containing hot water, the vessel or utensil being upon a stove. The heat from the hot water drives out all air that may be in the preserves, and thus insures against the preserves spoiling after the top of the jar is put on.

In the drawing forming a portion of this specification there is shown a perspective view of a jar-holder embodying the present invention.

Referring now to the drawing, the present jar-holder comprises two frames, each formed from a single wire. Each frame comprises two vertically-spaced members 5 and 6, connected at their upper ends by a slightly-arched portion 7, the connecting portion of the wire at the lower ends of the members 5 and 6 being offset upwardly, as shown at 8, whereby there are formed feet 9. The upwardly-offset portions 8 directly receive the jar that is placed in the holder, and they serve to support the jar above the bottom of the utensil in which the jar is placed, so that the jar is not so apt to crack from the heat of the bottom of the utensil as when the jar sits close to said bottom. Connecting the members 5 and 6 of each frame are upper and lower semicircular wires 10 and 11, the corresponding wires of the two frames having interlocking eyes 12 at one end, whereby a hinge connection is formed between the two frames. At their opposite ends the wires 10 are provided, one with a hook 13 and the other with eyes 14, designed to receive the hook and hold the two frames securely in fixed relation.

In the use of the jar-holder the frames are swung apart and the jar is passed between them, after which the frames are swung together, so that the jar may rest upon the portions 8, the frames being held in this position by engagement of the hooks 13 in the eyes 14. The holder may be carried by grasping the arched portions 7 of the frames.

The wires 10 and 11 are secured to the sides of the frame by wrapping them around said sides, and they are held from sliding on the sides of the frames by means of lugs 15, formed on the sides of the frames.

What is claimed is—

A jar-holder comprising two frames each formed of a single wire and including vertically-spaced members connected at their outer ends by an upwardly-arched portion and at their lower ends by a portion having its central part displaced upwardly, upper and lower semicircular wires secured to each frame, the oppositely-lying wires of the two frames having at one end interlocking eyes and having at their opposite ends one a hook and the other an eye disposed for engagement by the hook, the upwardly-displaced portions of the frames being arranged to receive and support a jar.

In testimony whereof I affix my signature in presence of two witnesses.

ANNIE FOX.

Witnesses:
　PETER FOX,
　D. S. MCCLURE.